Feb. 24, 1942. J. H. COHEN 2,274,607
COFFEE MAKER
Filed Aug. 14, 1940 2 Sheets-Sheet 1

INVENTOR
Joseph H. Cohen
BY
ATTORNEYS

Feb. 24, 1942.   J. H. COHEN   2,274,607
COFFEE MAKER
Filed Aug. 14, 1940   2 Sheets-Sheet 2

INVENTOR
Joseph H. Cohen
BY Johnson, Shirley Smyth
ATTORNEYS

Patented Feb. 24, 1942

2,274,607

UNITED STATES PATENT OFFICE 2,274,607

COFFEE MAKER

Joseph H. Cohen, Bridgeport, Conn., assignor to Casco Products Corporation, Bridgeport, Conn., a corporation of Connecticut Application August 14, 1940, Serial No. 352,539

17 Claims. (Cl. 219—43)

This invention relates to coffee making appliances, and, more particularly, to the type in which water in a closed lower vessel is heated and forced by the pressure formed above the water, due to heating of the same, up through ground coffee in an upper vessel, and then subsequently drawn down through the ground coffee as a result of a partial vacuum being formed in the lower or water heating vessel upon cooling of the latter. This type of appliance has been termed a vacuum type coffee maker.

Previous coffee makers of this type have generally consisted of a lower or water heating vessel having a single opening or orifice down into which a hollow stem on the upper or coffee steeping vessel extends. The upper vessel usually is supported on the lower vessel in a manner so as to seal the latter.

Coffee brewed by an appliance such as just described is excellent, but the appliance is cumbersome, and, to pour the coffee after the same had been brewed, it is necessary to remove the upper vessel and store it in some safe place. The storage of the upper vessel presents many times a perplexing problem, for it cannot be supported upright due to the hollow stem projecting from its base, unless it be supported on a holder having an opening to take the tube, and, even when so supported, it is easily tipped over because the center of gravity of the vessel is above the point at which it is supported by the holder.

The appliance of the present invention, as the two vessels are mechanically held together as one vessel, permits coffee to be brewed and served at the dining table without the inconvenience and bother which is now attendant upon the removal and storage of the steeping vessel after the coffee is brewed and before it may be served.

To facilitate serving of the brewed coffee, the appliance of the present invention is provided with a pouring spout formed on the lower vessel through which the brewed coffee may be poured. This spout is completely sealed by a suitable stopple during the brewing of the coffee and prevents any egress of air into the lower vessel so that the action of the appliance is in no way impaired.

To prevent the stopple used with the pouring spout from becoming lost after the coffee is brewed, and it is desired to serve the same, the stopple may be conveniently stored in a cap closing an opening in the upper vessel.

To permit the appliance of the present invention to be used at the table side, a heater or stove is provided for heating the water in the lower vessel to effect the infusion of the water with the ground coffee held in the upper vessel.

The heating unit of the present invention comprises a pair of resistance units having different resistances. The resistance units are carried by a suitable heater support which also supports the coffee maker while in use.

To control the heating of the water in the lower vessel, the present invention provides means for energizing the unit having a low resistance without energization of the other unit to produce a high temperature to quickly bring the water in the vessel to a boiling temperature. It is desirable to reduce the temperature of the heat supplied the lower vessel after the water has infused with the coffee, and, to this end, the present invention provides means for jointly energizing the two units.

The two resistance units are, according to the herein shown invention, series connected in a main heater circuit but to allow the high resistance unit to be removed from the circuit, a secondary circuit is provided having a normally open switch therein which, when closed, completes a shunt circuit around the high resistance unit.

In the broader aspects of this invention, any means may be employed for closing the switch in the shunt circuit, but, in the preferred form of the invention, as herein shown, the closing of the switch is effected by the storage of the stopple in a suitable storage well formed in the casing which houses the resistance elements.

To permit the storage of the stopple in this well to close the circuit, the movable element of the switch is made resilient and is normally held out of engagement with a fixed contact, but is moved into engagement with the fixed contact when the stopple is stored in the well of the casing. The closing of the switch in the shunt circuit by the storage of the stopple in the well of the casing shunts from the main heating circuit the high resistance unit so that the low resistance unit alone is energized.

The water in the lower vessel will not rise into the upper vessel unless the pouring spout of the lower vessel is first sealed against the passage of air so that to effect an infusion the stopple must be removed from the well of the casing and placed in the spout of the lower vessel. The removal of the stopple from the well of the casing automatically opens the switch and places the high resistance unit again in series with the low resistance unit and the joint energization of the units reduces the heat supplied to the lower vessel so that the same may cool to permit the now brewed coffee to be drawn back down into the lower vessel.

It is desirable, however, that the water be held up in the upper vessel for a predetermined time to permit a proper infusion with the ground coffee. The appliance of the present invention is so designed that the heater unit does not cool quickly after the shunt circuit is opened, but rather retains sufficient temperature to maintain the lower vessel at a temperature to hold the water up in the upper vessel for a time necessary to insure a proper infusion of the water and ground coffee.

This is accomplished by the present invention by disposing the heating elements in a refractory plate housed within an imperforate casing permitting no air drafts which would tend to cool the elements, refractory plate or casing. The heat retained by the heater is, therefore, sufficient to cause the water if brought to boiling before the removal of the stopple to be driven up into the upper vessel and held therein to infuse with the ground coffee for a predetermined time sufficient to insure a proper infusion.

The lower vessel, although warmed by the series connected elements, will cool sufficiently to allow the brewed coffee to return after the predetermined elapse of time to the lower vessel from which is may be served through the pouring spout. When it is desired to serve the brewed coffee, the stopple may be removed from the pouring spout and stored in the cap closing the opening in the upper vessel.

Other features and advantages will hereinafter appear.

Figure 1:
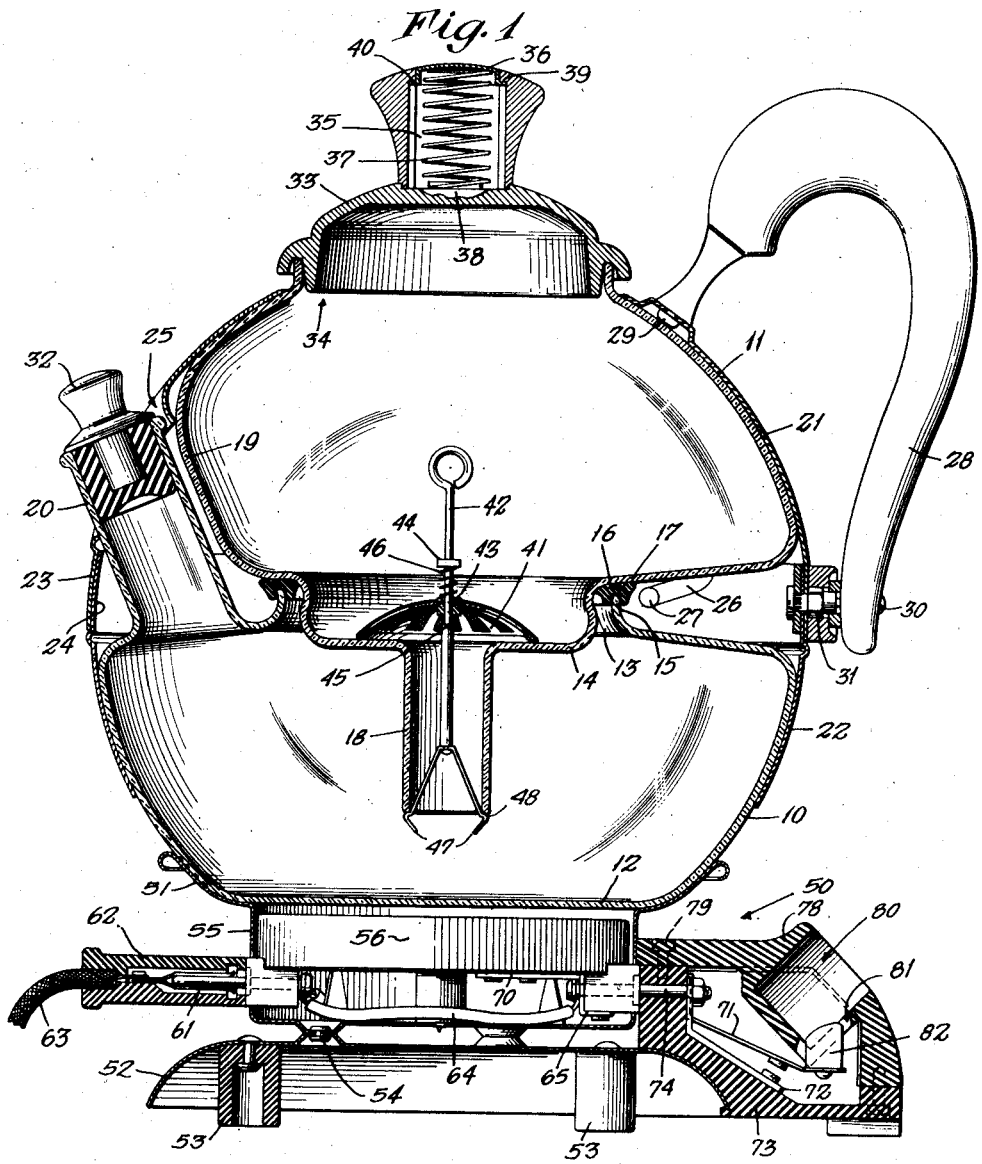
Figure 1 is a vertical section through the coffee maker of the present invention showing the parts in the position they occupy during the brewing of the coffee.
Figure 2:
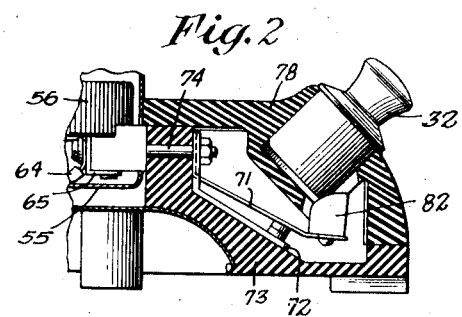
Fig. 2 is a fragmentary sectional view showing the stopple stored in the well of the heater casing and holding the switch closed.

As shown in the accompanying drawings, referring particularly to Fig. 1, the coffee maker of the present invention comprises a lower or water vessel 10 and an upper or steeping vessel 11, both vessels being approximately hemispherical and having their relatively flat sides juxtaposed so that when they are assembled the two vessels form a substantially spherical body.

The bottom of the lower vessel 10 is provided with a flat surface or base 12 by means of which the appliance may be supported upon a suitable surface, and at its upper end the vessel 10 has a relatively wide open mouth 13 adapted to receive a sump portion 14 of the steeping vessel 11. A lip 15 of the mouth 13 supports a gasket 16 of rubber or other suitable material which is engaged by a bottom portion 17 of the steeping vessel 11 and supports the steeping vessel on the lower vessel with the sump 14 extending into the lower vessel. The steeping vessel has the usual downwardly extending tube 18 through which water contained within the bottom vessel 10, when heated, will pass upwardly through ground coffee in the sump 14 and into the steeping vessel 11 where the coffee is brewed.

As shown in Fig. 1, the steeping vessel is suitably shaped as at 19 to provide clearance for an upwardly extending spout 20 communicating with the lower vessel 10, and through which the brewed coffee may be poured.

According to the present invention, the lower vessel 10 and the upper or steeping vessel 11 are held together as a unit and for this purpose any suitable means may be employed. In the now preferred form of the invention, the two vessels are united by a pair of properly shaped casings 21 and 22, overlying and underlying respectively the largest dimensions of the vessels 11 and 10. These casing parts are provided with overlying marginal portions 23 and 24 which are suitably secured together. The upper casing 21 is provided with an aperture 25 through which the pouring spout 20 of the lower vessel extends.

The casing parts 21 and 22 may be secured together by any suitable means, but preferably are secured together by bayonet locks comprising slots 26 formed in the casing part 22 and pins 27 carried by the casing part 21. After the vessels 10 and 11 are superposed, the parts 21 and 22 are placed over and under the vessels so that the pins 27 enter the slots 26, whereupon the lower casing part is turned relative to the upper casing part causing the parts to be drawn together by the inclined walls of the slots.

The appliance of the present invention is preferably provided with a handle to facilitate handling of the appliance, and, as herein shown, the handle 28 is secured at the upper end to casing part 21 by a rivet 29 and at the lower end is secured to the overlapped portions of the casing parts by a screw member 30 which is passed through suitable aligned apertures formed in the overlapped portions of the casing parts and threaded into a nut member 31 carried by the handle adjacent the lower end thereof.

It is necessary to prevent the escape of air and water vapor from the lower vessel 10 as the water is heated because it is the expansion of the air and water vapor above the water level in the lower vessel which forces the water therein to rise in the tube 18 and enter the steeping vessel. To prevent the loss of air and water vapor from the lower vessel 10, the spout 20 is provided with a stopple 32 which is removed when it is desired to pour or serve the brewed coffee.

To prevent the stopple 32 from being misplaced when it is removed from the pouring spout, there is formed in a cap 33 closing an opening 34 in the upper vessel 11 of the appliance, illustrated in Fig. 1, a suitable receptacle for receiving the stopple. This receptacle comprises a well 35 normally closed by a flanged disk 36 resiliently held in the position, shown in Fig. 1, by a coil spring 37 seating on the bottom wall 38 of the well. The well is provided with an annular downwardly facing shoulder 39 against which the flange 40 of the disk 36 is held by the spring 37 to limit the upper movement of the disk. The disk 36 may be easily depressed and the stopple 32, when removed from the pouring spout, may be inserted into the well and frictionally held therein against the action of the spring.

To prevent coffee grounds held by the sump 14 from being drawn down through the tube 18 into the lower vessel after the brewing operation, a suitable filter or strainer is used to retain the coffee grounds in the sump.

In the broader aspects of the invention, any suitable filter or strainer may be used, but, in the invention herein disclosed, this is accomplished by providing a filter received in the sump 14 and held over the opening at the upper end of the tube 18. The filter, as shown, may be covered with some suitable cloth to strain the brewed coffee and prevent the grounds from passing down into the lower vessel.

In the previously proposed coffee makers of this type, various means have been employed for holding the filter over the opening at the upper end of the tube so that coffee grounds cannot be drawn down into the lower vessel after the coffee has been brewed. In many of these previous devices, the means employed for properly seating the filter over the usual tube 18 have been cumbersome and difficult to use, and, consequently, were a source of annoyance to a user of a coffee maker of this type.

To obviate this annoyance, the filter, in the form of the invention shown in Fig. 1, comprises an apertured dome-shaped metallic member 41 about which is preferably fitted a suitable filter cloth or the like. The dome-shaped member 41 is provided with a small rod-like handle 42 extending upwardly therefrom to facilitate handling of the filter.

The handle 42 is slidably carried by a suitable bearing 43 secured to the dome-shaped member 41 and projects downwardly beneath the latter. The sliding movement of the handle 42 relative to the dome-shaped member 41 is limited by a collar 44 carried by the handle adjacent the upper end and a shoulder 45 formed on the lower projecting portion of the same. A coil spring 46 disposed about the handle 42 seats on the bearing 43 and works against the underneath side of the collar 44 to normally urge the handle 42 upward to the limit of movement allowed by the shoulder 45.

The handle carries at its lower end, which is disposed within the tube of the upper vessel 11, a plurality of spring fingers 47 formed with catch members 48 which are adapted to engage the lower edge of the tube when the handle 42 is depressed against the action of the spring 46. The spring fingers, due to their engagement with the lower edge of the tube, normally retain the filter tightly against the bottom wall of the sump and disposed over the tube 18.

Figure 3:
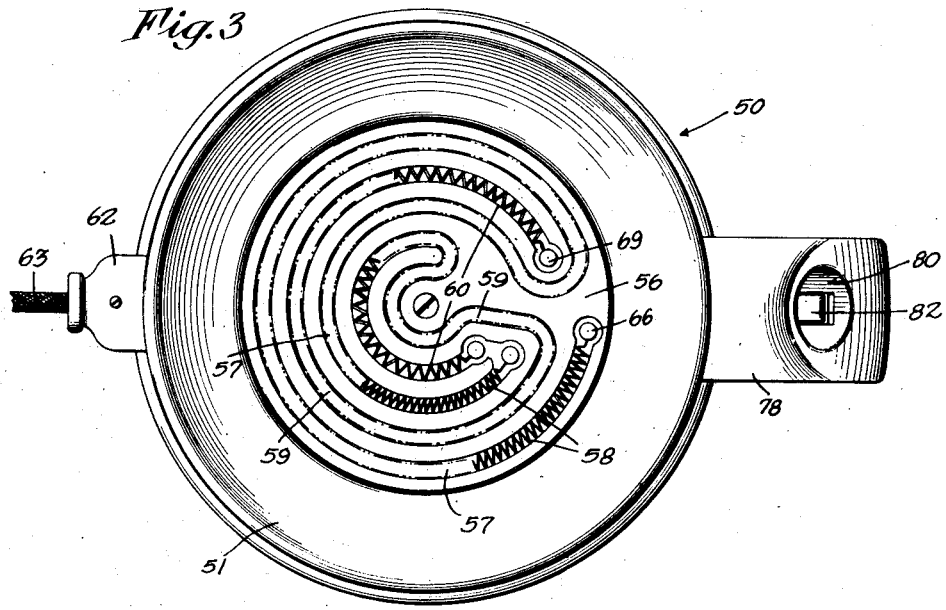
Fig. 3 is a top plan view of the coffee maker heater of the present invention.
Figure 4:
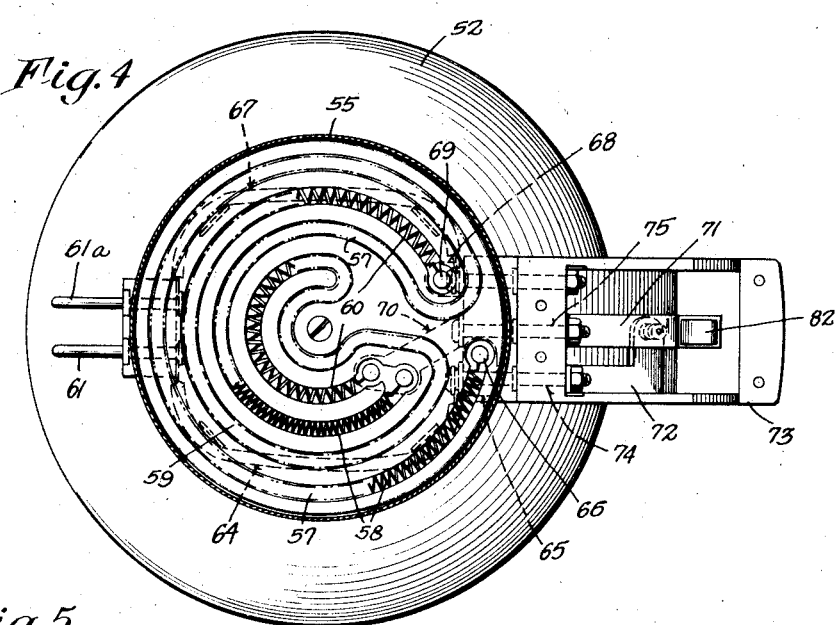
Fig. 4 is a view similar to Fig. 3 with the cover of the control unit removed and with certain details shown in broken lines.

To heat the water in the lower vessel, the present invention includes a stove 50 comprising a stand-like unit provided with a suitably formed seat 51 upon which the lower vessel 10 rests. The stove, referring now particularly to Fig. 1, comprises a suitable base plate 52 provided with a series of supporting feet 53. Secured to the base plate 52 by rivets or other suitable fastening means 54 is a casing 55 terminating in the lower bowl supporting platform 51. The casing 55 houses a disk 56 of refractory material which has its upper face, referring now to Figs. 3 and 4, formed with a series of connected grooves 57 receiving the helical resistance wire 58. A second series of grooves 59 also receives a helical resistance wire 60 but of a different size and offering a different resistance than the resistance wire 58.

Secured to the side wall of the casing 55 are a pair of conventional lead-in prongs 61 and 61a to be frictionally secured within the usual terminal sockets 62 of a connector cord 63. A conductor 64 interconnects the contact prong 61 and a conductor clip 65 carried by the underside of the disk 56 and connected to the one end of the resistance wire 58 by rivet 66. A second conductor 67 connects the prong 61a and a similar conductor clip 68 also carried by the undersurface of the disk 56 and connected to the one end of the resistance wire 60 by a rivet 69. The opposite ends of the resistance wires 58 and 60 are interconnected by a contact clip 70 so that when the prongs 61 and 61a are connected to a source of current a series circuit is established through the resistance wires 58 and 60.

In the use of coffee makers of this type, it is desirable to quickly raise the temperature of the water in the lower vessel to boiling temperature and then decrease the heat so that the water or lower vessel will cool sufficiently to allow the brewed coffee in the upper vessel to return to the lower.

To accomplish this desired feature, the present invention includes means for controlling the energization of the resistance wires to effect first a high temperature for quickly raising the temperature of the water and then a temperature sufficiently lower to allow the lower vessel to cool so that the brewed coffee may be drawn back into the same.

In the broader aspects of the invention, any control means may be employed, but in the invention as herein disclosed, this control is accomplished by a secondary circuit including a pair of contacts 71 and 72. The contacts 71 and 72 are carried within a small casing 73 of suitable insulating material secured to the side wall of the main heater casing 55. The contacts 71 and 72 are secured by current conducting studs 74 and 75 to the wall of a recess formed in the casing 73. The stud 74 is electrically connected to the conductor clip 65, while stud 75 is electrically connected by the conductor clip 70 to the ends of the resistance wires 58 and 60. Contact 71 is resilient and is normally held out of engagement with contact 72.

Figure 5:
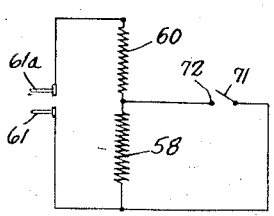
Fig. 5 is a diagrammatic view of the circuit of the heater of the present invention.

It will be seen, referring now to the wiring diagram shown in Fig. 5, that, with contact 71 out of engagement with contact 72, the circuit will be through both resistance wires 58 and 60 but that when contact 71 is brought into engagement with contact 72, the circuit completed shunts out the resistance wire 58 so that only resistance wire 60 is energized. Resistance wire 60 is of a lower resistance than the wire 58 so that energization of this wire alone, due to the increased current flow will produce a much higher heat than when the two resistances are connected in series.

To permit a convenient operation of the contacts 71 and 72, the recess of the casing 73 is provided with a cover 78 secured to the casing by suitable fastening means such as the bolts 79 shown. The cover plate 78 is provided with a well 80 of a size and shape to take the stopple 32 and the one wall of the well 80 is broken away as at 81 to permit a cam nose 82 carried by the free end of the resilient contact 71 to project therethrough.

It will be seen that when the stopple 32 is disposed in the well 80, the stopple engages the cam nose 82 and cams the resilient arm 71 downward and into engagement with the fixed contact 72.

The removal of the stopple 32 from the well 80 allows the resilient contact 71 to again move out of engagement with the contact 72.

It will be now seen that in the use of the device of the present invention, the lower vessel may be filled with water and coffee placed in the upper vessel, the prongs 61 and 61a connected through cord 63 to a source of current. The stopple 32 may now be placed in the well 80 which, as above explained, holds the contacts 71 and 72 in engagement to shunt out the resistance wire 58, whereupon resistance wire 60 attains a high temperature to quickly bring the water in the lower vessel to the boiling point. The stopple is now removed from the well 80 and placed in the mouth of the pouring spout to seal the pouring spout against the passage of air.

The removal of the stopple from the well 80, as has just been explained, allows the resilient contact to move out of engagement with the fixed contact which places the two resistance wires in series so that, as will be understood, less heat is applied to the lower vessel, but the heat retained by the casing 55, the refractory disk 56 and resistance wire is sufficient to drive the water up into the upper vessel.

It is desirable to hold the water in the upper vessel for a predetermined time to insure a proper infusion with the ground coffee and to this end the casing 55 has been made imperforate so that no air drafts are permitted to cool the disk and its associated elements to insure that sufficient heat is retained to hold the water up in the brewing vessel for a time necessary to insure a proper infusion. The lower vessel will then cool after the elapse of the predetermined time to cause a partial vacuum to be formed in the same which allows the brewed coffee to be drawn back down into the lower vessel. The heat supplied to the lower vessel by the series energization of the resistance wires is sufficient only to maintain the coffee at the proper drinking temperature.

If it is now desired to serve the brewed coffee, the stopple 32 may be removed from the spout and disposed in the well 35 where it may remain until it is again desired to brew another quantity of coffee.

Variations and modifications may be made within the scope of this invention and portions of the improvements may be used without others.

I claim:

1. A vacuum type coffee maker comprising a lower vessel and an upper vessel superposed on the lower vessel and having a tube extending into the lower vessel through an aperture therein, said lower vessel having a second aperture which is open to the atmosphere; and means for controlling the temperature of the lower vessel, said means comprising resistance elements electrically connected to constitute a heating circuit, means for closing the second aperture so that water in the lower vessel when heated will be driven up into the upper vessel, and means associated with said resistance elements for storing said closing means, said closing means when disposed in said storage means short circuiting a part of the resistance elements to increase the temperature of the lower vessel, the removal of said closing means from said storage means to close said aperture replacing said short circuited elements in the heating circuit to lower the temperature of the lower vessel.

2. A coffee maker of the vacuum type comprising a lower vessel and an upper vessel superposed on the lower vessel and having a tube extending into the lower vessel; a support for the lower vessel; electric heating means in said support for heating water in the lower vessel, said lower vessel having an orifice open to the atmosphere so that water may be heated in the lower vessel without being driven up through said tube into the upper vessel; means for closing the orifice to permit the heated water in the lower vessel to be forced up into the upper vessel to infuse with coffee therein and to permit the brewed coffee to be drawn back down into the lower vessel upon cooling and contraction of fluids in the latter; means on said support for holding the orifice-closing means, the electric heating means developing a high heat when the orifice-closing means is stored in said holding means and quickly bringing the water in the lower vessel to boiling temperature, the heating means developing a lesser heat when the orifice is closed by said closing means thereby preventing the lower vessel from quickly cooling so that the brewed coffee will not return to the lower vessel until after an elapse of time sufficient to insure a proper infusion of the water with the coffee held by the upper vessel.

3. A coffee maker of the vacuum type comprising a lower vessel and an upper vessel superposed on the lower vessel and having a tube extending into the lower vessel, said lower vessel having an orifice open to the atmosphere so that water may be heated in the lower vessel without being driven through said tube up into the upper vessel; means for closing the orifice to permit the water in the lower vessel to be forced when heated up into the upper vessel to infuse with coffee therein and to permit the brewed coffee to be drawn back down into the lower vessel upon cooling and contraction of fluids in the latter when cooled; and means for controlling the temperature of the lower vessel, said means comprising resistance elements electrically connected to constitute a heating circuit, means associated with said resistance elements for storing said closing means, means for cutting out of the heating circuit a part of said resistance elements to increase the temperature of the lower vessel, said means operative to cut out resistance elements from the heating circuit when the closing means is disposed in said storage means and operative, upon the removal of said closing means from said storage means for closing said orifice, to replace said elements in the heating circuit to lower the temperature of the lower vessel.

4. A vacuum type coffee maker comprising a lower vessel and an upper vessel superposed on the lower vessel and having a tube extending into the lower vessel which is provided with a second aperture open to the atmosphere; means for closing the second aperture so that water when heated in the lower vessel will be driven up into the upper vessel to infuse with ground coffee therein and returned to the lower vessel after the lower vessel has cooled; electric heating means for heating the water in the lower vessel; means for storing said aperture-closing means; and means controlled by the presence of the aperture-closing means in said storage means for quickly bringing the water in the lower vessel to boiling temperature and operative upon the removal of the aperture-closing means therefrom to maintain the lower vessel at a temperature sufficient to hold the water in the upper vessel for a time sufficient to insure a proper infusion of the water with the ground coffee.

5. In a coffee maker, a support; a heating unit within said support and comprising electric resistance means; a vacuum type coffee maker comprising interconnected lower water and upper coffee bowls having the water bowl seated on said support and adapted to be heated by said heating unit; a pouring spout on said lower vessel; means for closing said spout, means on said support for receiving and storing said spout-closing means; a shunt circuit around a portion of said electric resistance means; and means within said storage means and actuated by the storage of said spout-closing means for closing said shunt circuit to shunt out a part of said electric resistance means whereby a high temperature is attained by the resistance means energized to quickly bring the water in the lower vessel to a boiling temperature.

6. In a coffee maker, a support; a heating unit within said support and comprising electric resistance means; a vacuum type coffee maker comprising interconnected lower water and upper coffee bowls having the water bowl seated on said support and adapted to be heated by said heating unit; a pouring spout on said lower vessel; means for closing said spout; means on said support for receiving and storing said spout-closing means; a shunt circuit around a portion of said electric resistance means; means within said storage means and actuated by the storage of said spout-closing means for closing said shunt circuit to shunt out a part of said electric resistance means whereby a high temperature is attained by the heating means energized to quickly bring the water in the lower vessel to a boiling temperature, the removal of the spout-closing means and the closing of the spout therewith causing the water in the lower vessel to infuse with coffee in the upper vessel; and means carried by said coffee maker for storing said spout-closing means when it is desired to pour the coffee through said spout.

7. A vacuum type coffee maker comprising an upper vessel supported on a lower vessel having a pouring spout; means for closing the spout; means for supporting said coffee maker; an electric heater carried by said supporting means and comprising a pair of heating units; and means on said supporting means for storing said spout-closing means, the storage of said spout-closing means in said last-named means energizing one of said heating units to quickly heat the water in said lower vessel, the closing of said spout by said means after the water has reached boiling temperature causing said water to rise and infuse with the coffee in said upper vessel, the removal of said spout-closing means from said storage means to close said spout automatically energizing both of said heating units to permit said lower vessel to cool whereby the brewed coffee is drawn back down into said lower vessel.

8. A vacuum type coffee maker comprising a lower vessel and an upper vessel superposed on the lower vessel and having a tube extending into the lower vessel which is provided with a pouring spout; means for closing the spout so that water when heated in the lower vessel will be driven up into the upper vessel and returned to the lower vessel after the lower vessel has cooled; electric heating means including a circuit having a plurality of resistance units for heating the water in the lower vessel; and means for controlling the circuit to vary the effective resistance of said units to effect a control of the heat generated in said units, said means including storage means for said spout-closing means, the presence of the spout-closing means causing a high heat to be generated in said units and a low heat when the spout-closing means in said storage means is removed to close the spout.

9. A vacuum type coffee maker comprising a lower vessel and an upper vessel superposed on the lower vessel and having a tube extending into the lower vessel which is provided with a second aperture open to the atmosphere; means for closing the second aperture so that water when heated in the lower vessel will be driven up into the upper vessel and returned to the lower vessel after the lower vessel has cooled; electric heating means for heating the water in the lower vessel; and means including means for storing said aperture-closing means for effecting a control of the heating means, the storage of the aperture-closing means in said storage means effecting a control of the heating means such that the water in the lower vessel is quickly brought to boiling temperature, the removal of said aperture-closing means to close said aperture effecting a control of the heating means such that the lower vessel is cooled slowly to hold the water in the upper vessel for a predetermined time.

10. A vacuum type coffee maker comprising a lower vessel and an upper vessel superposed on the lower vessel and having a tube extending into the lower vessel which is provided with a second aperture open to the atmosphere; means for closing the second aperture so that water when heated in the lower vessel will be driven up into the upper vessel and returned to the lower vessel after the lower vessel has cooled; electric heating means for heating the water in the lower vessel; a casing housing said heating means and supporting said lower vessel; and means including storage means for said aperture-closing means for controlling the energization of said heating means, the presence of said aperture-closing means in said storage means effecting a control of said heating means such that the water in the lower vessel is quickly brought to boiling temperature, the removal of said aperture-closing means for closing the aperture causing said heating means to be so energized to allow the lower vessel to cool after a predetermined time and permit the brewed coffee to return to the lower vessel.

11. A vacuum type coffee maker comprising a lower vessel and an upper vessel superposed on the lower vessel and having a tube extending into the lower vessel; a pouring spout on said lower vessel; means for closing said spout; electric heating means for heating water in said lower vessel to drive the same up into the upper vessel, said heating means comprising a circuit including a plurality of electric resistance units; and means associated with said heating means for storing said spout-closing means, the storage of said spout-closing means in said last-named means varying the effective resistance of said units to effect a control of the heat generated in said units, the closing of said spout by said spout-closing means after the water has reached boiling temperature causing said water to rise and infuse with coffee in the upper vessel, the removal of said spout-closing means from said storage means to close said spout reducing the heat generated in said units, said electric heating means cooling slowly upon a reduction of heat generated to prevent the return of the brewed coffee to the lower vessel until a predetermined time after the heat generated in said units has been reduced.

12. A vacuum type coffee maker comprising a lower vessel and an upper vessel superposed on the lower vessel and having a tube extending into the lower vessel which is provided with a pouring spout; means for closing the spout so that water when heated in the lower vessel will be driven up into the upper vessel and returned to the lower vessel after the lower vessel has cooled; electric heating means for heating the water in the lower vessel, said electric heating means comprising a plurality of series connected resistance units; a shunt circuit around at least some of said units; a normally open switch in said circuit; and means controlled by the presence of the spout-closing means therein for closing said switch to shunt out at least a part of said units, the energization of the remaining units quickly bringing the water in the lower vessel to boiling temperature, the removal of the spout-closing means from the control means to close the spout automatically opening the switch and series energizing all the units whereby the temperature of the lower vessel is reduced to allow the brewed coffee to return to the same.

13. A vacuum type coffee maker comprising a lower vessel and an upper vessel superposed on the lower vessel and having a tube extending into the lower vessel; a pouring spout on the lower vessel; means for closing said pouring spout; a circuit including electric heating means for heating water in the lower vessel; means for altering the circuit to alter the temperature of the heating means, said means including means rendered operative by the storage and removal of the spout-closing means, said heating means developing a high temperature when the spout-closing means is stored in said storage means, the removal of the spout-closing means from the storage means to close the spout reducing the temperature of the heating means; and means for preventing quick cooling of the said heating means after the removal of the spout-closing means from the storage means to maintain the coffee infusion in the upper vessel for a predetermined time after said spout-closing means has been removed from the storage means.

14. A vacuum type coffee maker comprising a lower vessel and an upper vessel superposed on the lower vessel and having a tube extending into the lower vessel which is provided with a second aperture open to the atmosphere; means for heating water in the lower vessel to a boiling temperature; means for closing the second aperture to drive the boiling water in the lower vessel up into the upper vessel to infuse with ground coffee therein; and means for controlling said heating means, said means including means for storing the aperture-closing means, the storage of said aperture-closing means in said storage means causing a high temperature heat to be generated in said heating means, the withdrawal of said aperture-closing means to close said spout reducing the temperature of the heat generated in said heating means, and means for preventing quick cooling of the heating means after said spout is closed whereby the heat retained is sufficient to raise and hold the water up in the upper vessel for a time sufficient to insure a proper infusion of the water with ground coffee held by the upper vessel.

15. In a coffee maker, a support; a heating unit within said support and comprising electric resistance means; a vacuum type coffee maker comprising interconnected lower water and upper coffee bowls having the water bowl seated on said support and adapted to be heated by said heating unit; a pouring spout on said lower vessel; means for closing said spout to permit the heated water in the lower vessel to be forced up into the upper vessel to infuse with coffee therein and to permit the brewed coffee to be drawn back down into the lower vessel upon cooling and contraction of fluids in the latter; means on said support for receiving and storing said spout-closing means; and means for reducing the current flow through said electric resistance means so that the electric heating means will cool slowly to prevent the return of the brewed coffee to the lower vessel until after a predetermined elapse of time after said reduction of current flow, said means for reducing the current flow comprising a switch and the spout-closing means, said spout-closing means forming an operator for said switch and operable when received by said storage means to close said switch and short circuit a part of said electric resistance means to cause the remaining resistance means to develop a high heat, the switch being automatically opened upon the removal of said spout-closing means from the storage means for closing said pouring spout and replacing the short circuited electric resistance means in the circuit.

16. In a vacuum type coffee maker comprising a lower vessel and an upper vessel superposed on the lower vessel and having a tube extending into the lower vessel; a pouring spout on said lower vessel; means for closing said spout; means for supporting said lower vessel; electric resistance means carried by said support; means carried by said support for receiving and storing said spout-closing means; a normally open circuit carried by said support; and means in said circuit for closing the same upon the storage of the spout-closing means in said storing means to shunt out a part of said electric resistance means whereby a high temperature is attained by the resistance means energized to quickly bring the water in the lower vessel to a high temperature.

17. A vacuum type coffee maker comprising an upper vessel supported on a lower vessel having a pouring spout; means for closing the spout; a cap closing an opening in said upper vessel; means for supporting said coffee maker; an electric heater carried by said supporting means and comprising a pair of heating units, and means on said supporting means for storing said spout-closing means, the storage of said spout-closing means in said last-named means energizing one of said heating units to quickly heat the water in said lower vessel, the closing of said spout by said means after the water has reached boiling temperature causing said water to rise and infuse with the coffee in said upper vessel, the removal of said spout-closing means from said storage means to close said spout automatically energizing both of said heating units to permit said lower vessel to cool whereby the brewed coffee is drawn back down into said lower vessel; and means carried by said cap for receiving and holding the spout-closing means after the brewed coffee is drawn back down into said lower vessel so that the brewed coffee may be served through said pouring spout.

JOSEPH H. COHEN.